United States Patent
Utsumi et al.

(10) Patent No.: US 12,066,388 B2
(45) Date of Patent: Aug. 20, 2024

(54) INSPECTION SYSTEM

(71) Applicant: WIT CO., LTD., Chiba (JP)

(72) Inventors: Masato Utsumi, Chiba (JP); Koji Kurano, Chiba (JP); Ken Ideyama, Chiba (JP)

(73) Assignee: WIT CO., LTD., Chiba (JP)

( * ) Notice: Subject to any disclaimer, the term of this patent is extended or adjusted under 35 U.S.C. 154(b) by 575 days.

(21) Appl. No.: 17/282,877

(22) PCT Filed: Oct. 21, 2020

(86) PCT No.: PCT/JP2020/039630
§ 371 (c)(1),
(2) Date: Apr. 5, 2021

(87) PCT Pub. No.: WO2022/085135
PCT Pub. Date: Apr. 28, 2022

(65) Prior Publication Data
US 2022/0307988 A1   Sep. 29, 2022

(51) Int. Cl.
*G01N 21/88*     (2006.01)
*G01N 21/956*    (2006.01)

(52) U.S. Cl.
CPC ....... *G01N 21/8851* (2013.01); *G01N 21/956* (2013.01); *G01N 2021/8893* (2013.01); *G01N 2021/95646* (2013.01)

(58) Field of Classification Search
CPC ........... G01N 21/95684; G01N 21/956; G01N 21/8851; G01N 2021/95638; G01N 2021/8893; G01N 2021/95646
See application file for complete search history.

(56) References Cited

U.S. PATENT DOCUMENTS

| | | | |
|---|---|---|---|
| 2011/0050889 A1* | 3/2011 | Kiuchi | G06T 1/20 348/135 |
| 2012/0154607 A1* | 6/2012 | Moed | G06F 3/0304 348/207.1 |

(Continued)

FOREIGN PATENT DOCUMENTS

| | | |
|---|---|---|
| CN | 208013055 U | 10/2018 |
| JP | 2001-141601 A | 5/2001 |

(Continued)

OTHER PUBLICATIONS

Oct. 19, 2021, European Search Report issued for related EP Application No. 21169579.6.

*Primary Examiner* — Sang H Nguyen
(74) *Attorney, Agent, or Firm* — Paratus Law Group, PLLC

(57) ABSTRACT

In order to reduce inspection tact time in centralized management of a plurality of inspection lines, the system includes: a plurality of inspection lines 4 each having a visual appearance inspection device 3; a first database 5A for storing a captured image captured by each of the visual appearance inspection device 3; and a centralized control device 6 connected to each of the visual appearance inspection devices 3 and the first database 5A, having a display unit 32 that displays an inspection image of an inspection object 7, and enabling visual inspection of the inspection object 7 conveyed on each of the inspection lines 4 in a centralized manner; wherein, while one of the inspection lines 4 is inspected by using the centralized control device 6, the visual appearance inspection devices 3 of the other inspection lines 4 pre-captures the inspection object 7 conveyed on the inspection line 4 under predetermined capturing conditions and stores the pre-captured image in the first database 5A, and wherein the pre-captured image read from the first (Continued)

database 5A is displayed on the display unit 32 in the visual inspection.

12 Claims, 10 Drawing Sheets

(56) References Cited

U.S. PATENT DOCUMENTS

| | | | | |
|---|---|---|---|---|
| 2014/0304637 | A1* | 10/2014 | Ijiri | G06T 1/20 |
| | | | | 715/771 |
| 2018/0202941 | A1* | 7/2018 | Konno | G01N 21/8914 |
| 2019/0147586 | A1* | 5/2019 | Ikeda | G06T 7/0004 |
| | | | | 382/157 |
| 2019/0258225 | A1* | 8/2019 | Link | G05B 19/4097 |
| 2019/0303114 | A1* | 10/2019 | Tokashiki | G06F 8/20 |
| 2020/0116650 | A1 | 4/2020 | Loken et al. | |
| 2020/0273203 | A1* | 8/2020 | Kitamura | G06T 7/248 |
| 2021/0012475 | A1* | 1/2021 | Hyatt | G01N 21/8851 |
| 2021/0056681 | A1* | 2/2021 | Hyatt | G05B 19/41875 |

FOREIGN PATENT DOCUMENTS

| | | |
|---|---|---|
| JP | 2002-372496 A | 12/2002 |
| JP | 2004-279037 A | 10/2004 |
| JP | 2008-076248 A | 4/2008 |
| JP | 2008-102075 A | 5/2008 |
| JP | 2008-111687 A | 5/2008 |
| JP | 2009-014442 A | 1/2009 |
| JP | 2010-139461 A | 6/2010 |
| JP | 2011-138930 A | 7/2011 |
| JP | 2015-152312 A | 8/2015 |
| WO | WO 2013/001594 A1 | 1/2013 |

\* cited by examiner

INSPECTION SYSTEM

CROSS REFERENCE TO PRIOR APPLICATION

This application is a National Stage Patent Application of PCT International Patent Application No. PCT/JP2020/039630 (filed on Oct. 21, 2020) under 35 U.S.C. § 371, which is hereby incorporated by reference in its entirety.

TECHNICAL FIELD

The present technology relates to an inspection system for inspecting an inspection object which is conveyed on an inspection line, and more particularly to an inspection system for enabling centralized management of a plurality of inspection lines.

BACKGROUND ART

Conventionally, electronic components such as ICs, LSIs, capacitors, and resistors are densely mounted on a printed circuit board in order to miniaturize electronic devices. In high-density mounting of electronic components on a printed circuit board, for example, pads are formed on a rigid printed circuit board such as glass epoxy on which wiring patterns are formed by cream solder or etching of copper foil and electronic components are to be mounted. Next, after the cream solder is printed on the pad by screen printing or the like, electronic components are mounted at predetermined positions by an automatic component mounting machine or the like, and a reflow soldering process is performed. In the inspection process after the manufacturing, an appearance inspection of mounting state and soldering state is performed by using an appearance inspection device and a circuit continuity inspection and function confirmation of electrical operations are also performed.

In the appearance inspection of a printed circuit board on which electronic components and the like are surface-mounted, an inspection by an automatic appearance inspection device and an inspection by a visual appearance inspection device are used together, and a printed circuit board which is determined to be defective by the appearance inspection by the automatic appearance inspection device is subjected to the appearance inspection by the visual appearance inspection device to confirm the mode of defective mounting. Examples of the automatic inspection device include an automatic optical inspection (AOI) device, an automatic X-ray inspection (AXI) device, and an in-circuit tester (ICT) device. For example, the visual appearance inspection is conducted by a visual appearance inspection device such as that shown in Patent Document 1.

This visual appearance inspection device is provided with: a support unit for supporting a printed circuit board to be inspected which is determined to include a mounting defect by an automatic appearance inspection device; a camera for imaging an inspection-required portion of the printed circuit board to be inspected; and a moving mechanism for relatively moving the positions of the camera and the printed circuit board to be inspected to align the position where the camera can capture an image with the inspection-required portion of the printed circuit board. Then the image data captured by the camera is displayed on a monitor and visually inspected through the monitor by an inspector. Here, the visual appearance inspection device is also provided with an oblique camera for capturing an image of a soldered portion or the like from obliquely above, in addition to a plane camera for capturing an image of a surface of a printed circuit board or an electronic component from above, in order to confirm a printing defect or the like on the surface of the printed circuit board or the electronic component. This is because the soldering portion is three-dimensional, and therefore, it is easier for the inspector to visually confirm the state of the soldering by capturing the position from obliquely above.

PRIOR ART REFERENCE

Patent Reference

Patent Document 1: Japanese Unexamined Patent Application Publication No. 2015-152312

SUMMARY OF THE INVENTION

Problem to be Solved by the Invention

In the field where mass production of printed circuit boards and the like is required, labor saving in terms of personnel and time is also required in the inspection process. For this reason, there has been proposed an inspection system provided with a plurality of inspection lines on which an automatic appearance inspection device and a visual appearance inspection device are arranged on a conveyance path of an inspection object, as well as a centralized management terminal for performing inspections on the plurality of inspection lines in a centralized manner to perform inspections on the plurality of inspection lines in parallel. By the inspection system using such a centralized management terminal, since the inspector inspects the inspection images of the visual appearance inspection device in the plurality of inspection lines, it is possible to suppress variations in inspection quality and to save the labor of the inspection process.

However, in the inspection system in which inspections on the plurality of inspection lines are performed in an centralized manner by using the centralized management terminal, the inspection of other inspection lines cannot proceed until a visual inspection by an inspector operating the centralized management terminal is completed, and thus tact time reduction of the inspection process is desired.

Moreover, in order to reduce the tact time of the inspection process, it is also necessary to reduce the inspection time of the visual inspection itself conducted by an inspector operating the centralized control terminal.

In view of the problems described above, an object of the present invention is to provide an inspection system capable of reducing the tact time of an inspection process in an inspection system in which a plurality of lines are inspected in a centralized manner.

In order to solve the problems described above, an inspection system according to the present invention includes: a plurality of inspection lines each having a visual appearance inspection device; a first database for storing a captured image captured by each of the visual appearance inspection device; and a centralized control device connected to each of the visual appearance inspection devices and the first database, having a display unit that displays an inspection image of an inspection object, and enabling visual inspection of the inspection object conveyed on each of the inspection lines in a centralized manner, wherein, while one of the inspection lines is inspected by using the centralized control device, the visual appearance inspection device of the other inspection line pre-captures the inspection object conveyed on the inspection line under predetermined capturing conditions and stores the pre-captured image in the first database, and wherein the pre-captured image read from the first database is displayed on the display unit in the visual inspection.

Further, an inspection method according to the present invention includes: preparing a plurality of inspection lines each having a visual appearance inspection device; preparing a first database for storing a captured image captured by each of the visual appearance inspection device; and preparing a centralized control device connected to each of the visual appearance inspection devices and the first database, having a display unit that displays an inspection image of an inspection object, and enabling visual inspection of the inspection object conveyed on each of the inspection lines in a centralized manner, wherein, while one of the inspection lines is inspected by using the centralized control device, the visual appearance inspection device of the other inspection line pre-captures the inspection object conveyed on the inspection line under predetermined capturing conditions and stores the pre-captured image in the first database, and wherein the pre-captured image read from the first database is displayed on the display unit in the visual inspection.

Effects of the Invention

According to the present technology, in a system for performing visual inspection by displaying an inspection image captured by a visual appearance inspection device provided in each inspection line on a centralized control device, the tact time of the inspection process can be reduced.

MODE FOR CARRYING OUT THE INVENTION

Figure 1:
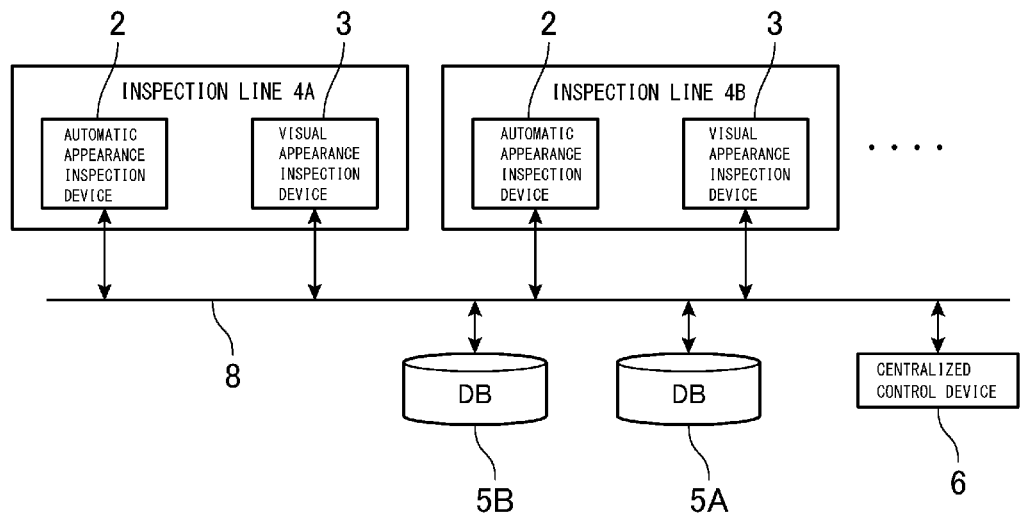
FIG. 1 is a view illustrating an overall configuration of an inspection system.

Hereinafter, an inspection system according to the present technology will be described in detail with reference to the drawings. It should be noted that the present disclosure is not limited to the following embodiments and various modifications can be made without departing from the scope of the present technology. Moreover, the features illustrated in the drawings are shown schematically and are not intended to be drawn to scale. Actual dimensions should be determined in consideration of the following description. Furthermore, those skilled in the art will appreciate that dimensional relations and proportions may be different among the drawings in certain parts.

As shown in FIG. 1, an inspection system 1 according to the present technology is provided with a plurality of inspection lines 4 (inspection line 4A, inspection line 4B, . . . ) each having an automatic appearance inspection device 2 and a visual appearance inspection device 3, a database 5 for storing a captured image or the like of the visual appearance inspection device 3, and a centralized control device 6 which is connected to the visual appearance inspection device 3 of each inspection line 4 and to the database 5, has a display unit for displaying an inspection image of an inspection object, and enabling an appearance inspection of the inspection objects conveyed on each inspection line 4 in a centralized manner.

During the inspection of one inspection line 4 by the centralized control device 6, the inspection system 1 pre-captures the inspection object of the other inspection line 4 by the visual appearance inspection device 3 of the other inspection line 4 under predetermined capturing conditions, and after the inspection of the one inspection line 4 is completed, displays the pre-captured image of the other inspection line 4 on the display unit.

Thus, in a system in which an image captured by the visual appearance inspection device 3 provided in each inspection line 4 is displayed on the centralized control device 6 for visual inspection, the inspection system 1 can reduce the tact time of the inspection process by pre-capturing an inspection-required portion of an inspection object in advance with the visual appearance inspection device 3 provided in each of the inspection lines 4.

That is, in the inspection system 1, each inspection line 4 is provided with the automatic appearance inspection device 2 and the visual appearance inspection device 3, and visual inspection of an inspection object conveyed on each inspection line 4 is performed in a centralized manner by displaying an inspection image on a display unit such as a monitor provided in the centralized control device 6. Further, in the inspection system 1, the automatic appearance inspection device 2 and the visual appearance inspection device 3 are each provided with capturing means, and the visual inspection by the centralized control device 6 is conducted by using an image captured by the visual appearance inspection device 3.

Therefore, when a visual inspection is required simultaneously for the plurality of inspection lines 4, the visual inspection of the inspection object on one inspection line 4 is conducted, while the other inspection lines waits. If the visual appearance inspection device 3 of the other inspection line moves the capturing camera to the inspection-required portion of the inspection object after the visual inspection in one inspection line 4 is completed, a time will be required for moving and focusing the camera to capture the inspection-required portion of the inspection object at a predetermined angle and depth of focus, during which the inspector will be in an inspection waiting state in which the inspection by the centralized control device 6 cannot be proceeded, resulting in a loss in the tact time of the inspection process. When there are a plurality of inspection-required portions with respect to one inspection object, the time required for moving the capturing camera will be further increased to extend the tact time of the inspection process.

Therefore, in the inspection system 1 according to the present technology, while an inspection of one inspection line 4 by the centralized control device 6 is conducted, the visual appearance inspection device 3 of the other inspection line 4 captures an inspection-required portion of an inspection object of the other inspection line 4 under predetermined capturing conditions. In the present technology, this is referred to as "pre-capturing", and the image captured by the pre-capturing is referred to as "pre-captured image". The pre-captured image is stored in the database 5. When the inspection of one inspection line 4 is completed, the inspector switches the display screen of the display unit of the centralized control device 6 to the pre-captured image in the other inspection line. The pre-captured image data of the other inspection lines are read from the database 5 and displayed on the display unit of the centralized control device 6. As a result, the inspector can promptly perform the visual inspection of the inspection object on the other inspection line 4.

In this manner, the inspection system 1 can reduce the tact time of the visual inspection process by causing the centralized control device 6 to display the pre-captured image captured by the visual appearance inspection device 3 provided in each inspection line 4.

The inspection-required portion refers to a portion which needs to be visually inspected such as a portion suspected of mounting defect specified by the inspection by the automatic appearance inspection device 2 performed prior to the visual inspection with the visual appearance inspection device 3. The position data of the inspection-required portion is defined by an XYΘ coordinate system inherent to the capturing cameras 11 and 21 described later. Among these, XY is the XY coordinates which are the two orthogonal coordinates in the inspection plane of the inspection object and defines the capturing positions of the capturing cameras 11 and 21. In addition, θ denotes an angle at which the inspection surface of the inspection object is rotated counterclockwise around the X-axis with the center point of the XY coordinates as the rotation center, and defines a capturing direction (θ direction) by oblique cameras 11a and 21a described later. The position data (XYθ coordinate data) of the inspection-required portion is stored in the database 5 by the automatic appearance inspection device 2, and the visual appearance inspection device 3 can pre-capture the position by referring to the position data stored in the database 5.

Hereinafter, each component of the inspection system 1 will be described. It should be noted that the inspection system 1 is preferably used for inspecting the mounting state of a printed circuit board on which various electronic components such as ICs, LSIs, resistors, capacitors, and the like are surface-mounted, but the inspection objects are not limited thereto. Hereinafter, a printed circuit board 7 on which electronic components are surface-mounted will be described as an example of an inspection object.

The inspection system 1 has the plurality of inspection lines 4 each having the automatic appearance inspection device 2 and the visual appearance inspection device 3. Each inspection line 4 has a conveyance means such as a belt conveyor for conveying the inspection objects, and the automatic appearance inspection device 2 and the visual appearance inspection device 3 are provided at the conveyance line for conveying the inspection objects. Thus, the inspection line 4 can convey the inspection objects one after another and inspections for them can be continuously performed.

As shown in FIG. 1, the automatic appearance inspection device 2 and the visual appearance inspection device 3 provided on each inspection line 4 are connected to the database 5 and the centralized control device 6 via a bus 8. The database 5 includes a first database 5A connected to the visual appearance inspection device 3 and storing various data acquired by the visual appearance inspection device 3, and a second database 5B connected to the automatic appearance inspection device 2 and storing various data acquired by the automatic appearance inspection device 2. The databases 5A and 5B are also connected to the centralized control device 6 via the bus 8. It should be noted that the connection form of the devices 2, 3 and the databases 5A, 5B via the bus 8 in the inspection system 1 is merely an example, and it goes without saying that a network connection form other than the bus type may be used.

Then, the inspection system 1 automatically inspects a predetermined inspection portion of the inspection object by the automatic appearance inspection device 2, and the inspection object having received a predetermined determination such as defective or indeterminate is visually inspected with the visual appearance inspection device 3.

Automatic Appearance Inspection Device

The automatic appearance inspection device 2 is a device for capturing the inspection object on the inspection line 4 and automatically determining the quality of the inspection object on the basis of the image data and is provided on the inspection line 4 on the upstream side in the conveyance direction of the inspection object with respect to the visual appearance inspection device 3. Although the inspection objects may be mounted onto and removed from the automatic appearance inspection device 2 either manually or automatically, but an automatic method is preferable in view of reduction of the inspection tact time.

Figure 2:
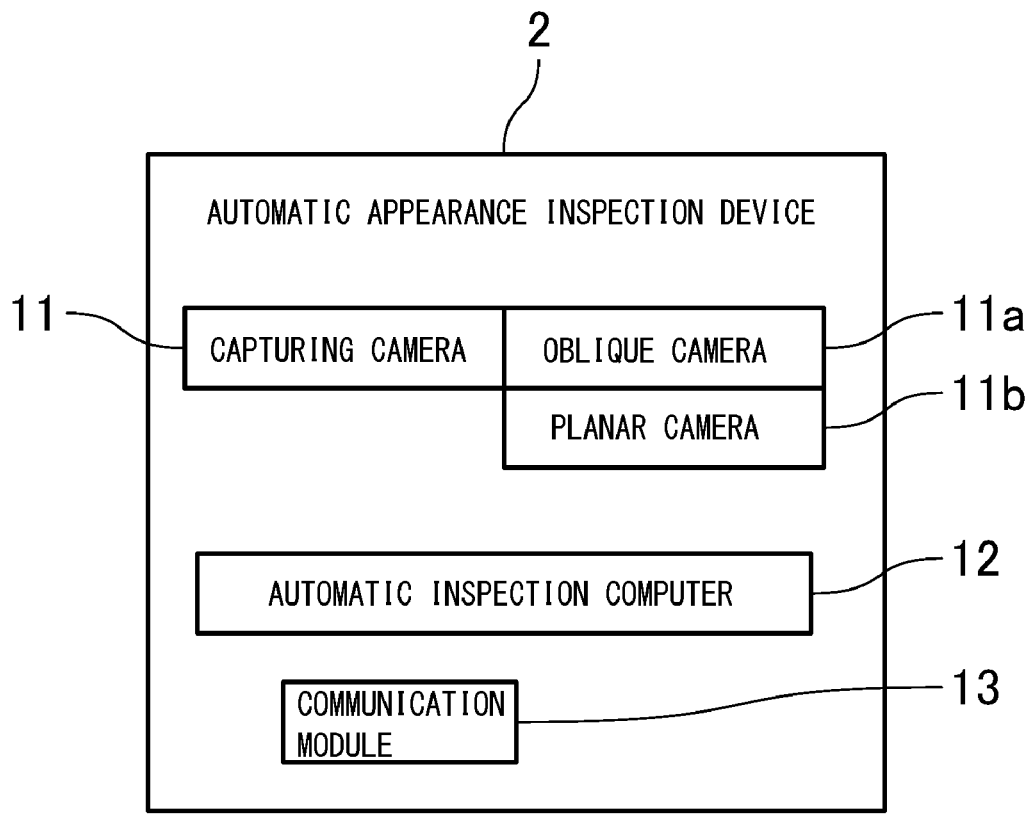
FIG. 2 is a view illustrating a main configuration of an automatic appearance inspection device.

As shown in FIG. 2, the automatic appearance inspection device 2 includes a capturing camera 11 such as a CCD camera for capturing an inspection object, an automatic inspection computer 12 for performing quality determination on the basis of the image data captured by the capturing means, and a communication module 13 connected to the bus 8 and communicating with the second database 5B or the like.

The capturing camera 11 includes an oblique camera 11a for capturing a predetermined inspection portion of an inspection object from obliquely above. The capturing camera 11 may also include a planar camera 11b for imaging the surface of the inspection object from above. In addition to being disposed at the upper side of the device housing, the capturing camera 11 may be supported by a rotation mechanism so that the inspection object can be captured from any direction.

The automatic inspection computer 12 executes an automatic determination processing program to capture a predetermined inspection portion of an inspection object by the capturing camera 11 and to perform quality determination of the predetermined inspection portion by using captured image data. Specifically, the automatic appearance inspection device 2 has, in advance, position data indicating an inspection portion of the printed circuit board 7 to be inspected, and captures sequentially, for example in order of proximity, inspection images such as a plane image and an oblique image at a position indicated by the position data according to the program. The automatic determination result can be arbitrarily set as "OK", "NG", "indeterminate", and so on. Any known image processing program can be used for this quality determination.

Thus, the inspection system 1 can automatically perform, by the automatic appearance inspection device 2, the quality determination of the soldering of the electronic components mounted on the printed circuit board 7 and store the automatic determination result in the second database 5B via the communication module 13.

Further, from the automatic appearance inspection device 2, through the communication module 13, various data such as "defective portion data" and "defect content" are stored in the second database 5B in association with each other along with the substrate ID, the component ID, and the automatic determination result, among other information. The "defective portion data" refers to an XYO coordinate of a position where a defect of an inspection object is found. In addition, "defect content" refers to data that categorize defect conditions in advance (for example, bridge, displacement, and lack of electrode, among others), and classifies the types of defects. The automatic appearance inspection device 2 may store an automatic determination image obtained by converting captured image used for automatic determination into data in the second database 5B. In the second database 5B, data such as the automatic determination result, the automatic inspection image, the automatic capturing condition data (angle, magnification, or the like), and the defective portion data (XYO coordinates) are maintained as automatic inspection data.

Operational Flow

Figure 3:
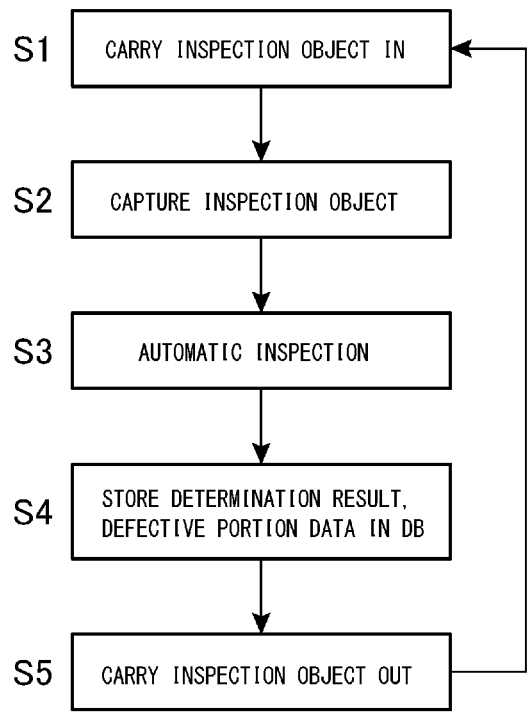
FIG. 3 is a flowchart illustrating an operational flow of an automatic appearance inspection device.

Next, the operation of the automatic appearance inspection device 2 will be described. As shown in FIG. 3, first, in step S1, an inspection object such as a printed circuit board is carried into the automatic appearance inspection device 2. Next, in step S2, the capturing camera 11 captures an image of a predetermined inspection portion from obliquely above or from above.

Then, in step S3, the quality determination at a predetermined inspection portion is performed using the captured image data by the automatic determination processing program. In step S4, the automatic appearance inspection device 2 transmits a determination result together with "defective portion data" and "defect content" to the second database 5B. Each transmitted data is stored in the second database 5B, and these automatic inspection data are referred to in capturing by the visual appearance inspection device 3. In step S4, the captured image data used for the determination by the automatic appearance inspection device 2 may be transmitted to and stored in the second database 5B.

Thereafter, in step S5, the inspection object is carried out and the next inspection object is carried in. In this manner, the inspection objects conveyed on the inspection line 4 are carried in the automatic appearance inspection device 2 and the inspections are continuously performed.

Visual Appearance Inspection Device

The visual appearance inspection device 3 is a device for capturing an image of an inspection object to be displayed on a display unit 32 of the centralized control device 6 and is provided on the inspection line 4 on the downstream side in the conveyance direction of the inspection object with respect to the automatic appearance inspection device 2. Although the inspection objects may be mounted onto and removed from the visual appearance inspection device 3 either manually or automatically, but an automatic method is preferable in view of reduction of the inspection tact time.

Figure 4:
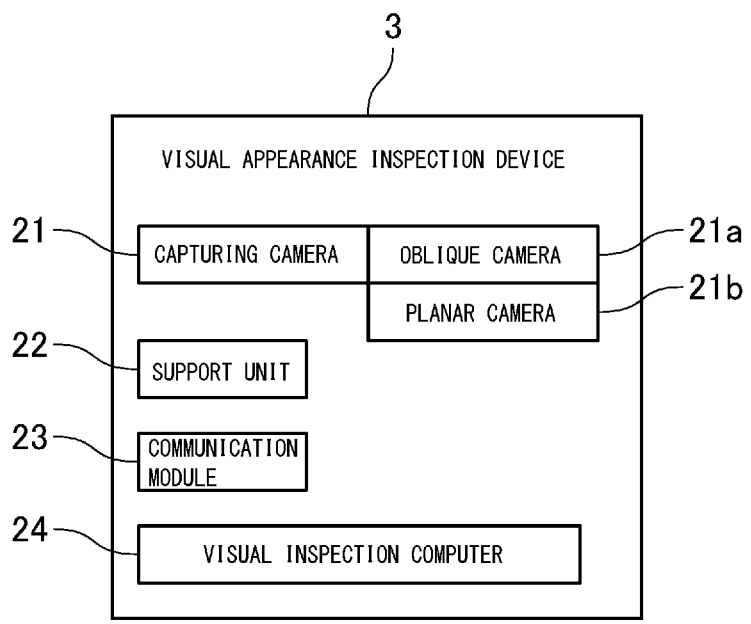
FIG. 4 is a view illustrating a main configuration of a visual appearance inspection device.
Figure 5:
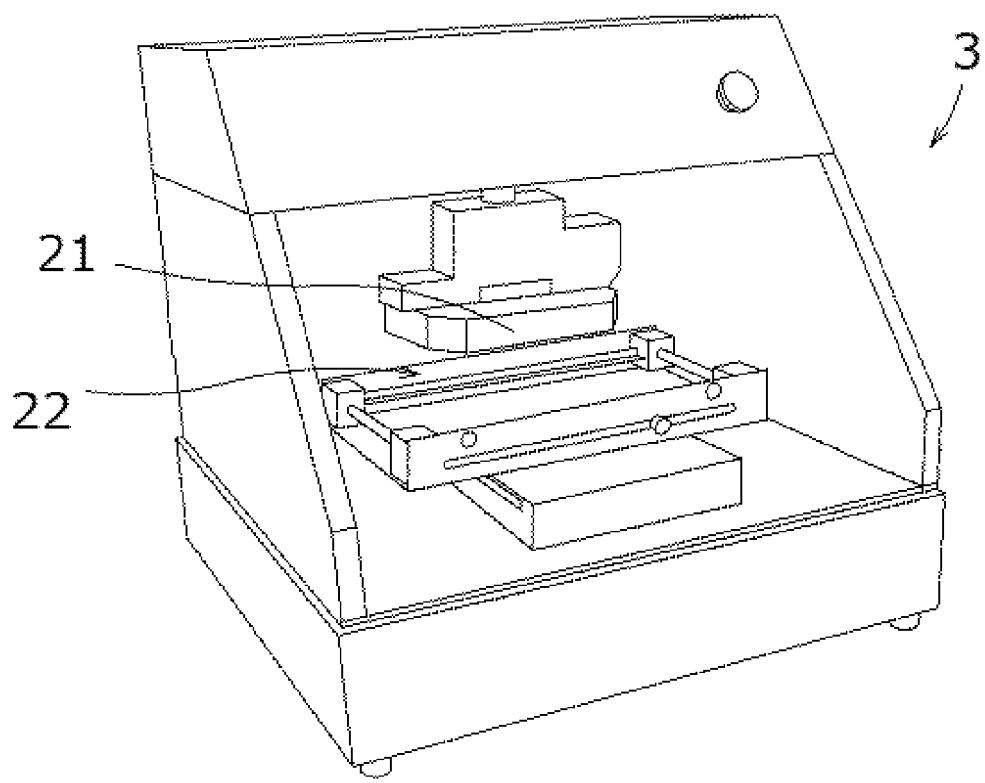
FIG. 5 is an external perspective view of a visual appearance inspection device.

As shown in FIGS. 4 and 5, the visual appearance inspection device 3 is provided with a capturing camera 21 such as a CCD camera for capturing an inspection object, a support unit 22 for supporting the inspection object, a communication module 23 connected to the bus 8 and communicating with the first and second databases 5A, 5B, the centralized control device 6, and the like, and a visual inspection computer 24 for performing pre-capturing by referring to defective portion data (XYO coordinates) of automatic inspection data. The visual appearance inspection device 3 can be remotely controlled by the centralized control device 6.

The capturing camera 21 is disposed at the upper side of the device housing and provided with an oblique camera 21a which captures a predetermined inspection-required portion of the inspection object from obliquely above. The capturing camera 21 may also include a planar camera 21b for capturing the inspection-required portion of the inspection object from above. In the visual appearance inspection device 3, the capturing camera 21 is disposed at upper side of the device housing, and the support unit 22 for supporting the inspection object or the capturing camera 21 is provided with a moving mechanism capable of moving the support unit 22 or the capturing camera 21 in the XYO direction, so that the capturing camera 21 can relatively move with respect to the inspection object supported by the support unit 22, and any position of the inspection object can be captured. Further, in the visual appearance inspection device 3, since the support unit 22 for supporting the inspection object or the capturing camera 21 is provided with a rotation mechanism, the capturing camera 21 can be relatively rotated with respect to the inspection object supported by the support unit 22, and the inspection object can be captured from any direction.

Figure 6:
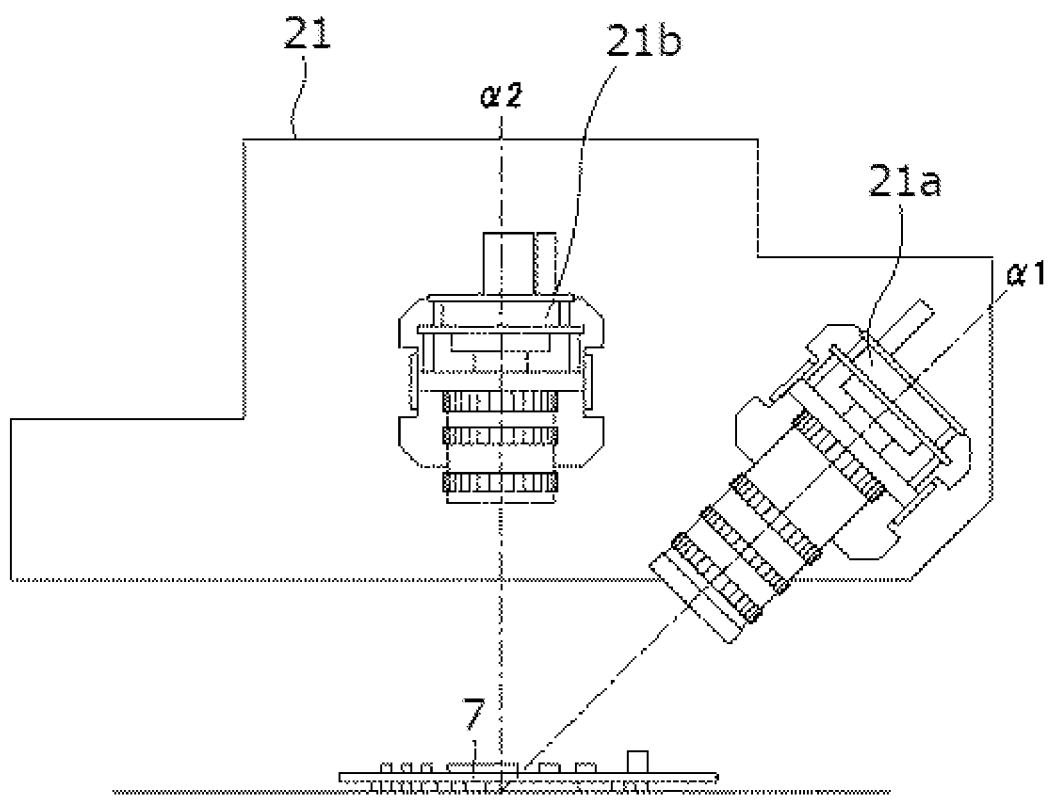
FIG. 6 is a view illustrating a configuration of a capturing camera.

The oblique camera 21a is supported by tilting the camera optical axis α1 obliquely with respect to the inspection object and captures the inspection object from obliquely above. As shown in FIG. 6, the oblique camera 21a is provided so that the optical axis is at an angle of, for example, 45° with respect to the printed circuit board 7 that is the inspection object. The planar camera 21b is supported with the camera optical axis α2 aligned with the rotation axis of the rotation mechanism and captures the inspection object from directly above.

In the capturing camera 21, a predetermined imaging lens and an imaging element are incorporated in each lens barrel of the oblique camera 21a and the planar camera 21b. The data of the captured image is stored in the first database 5A, and reproduced and displayed on the display unit 32 of a centralized control device 6 for visual inspection. The capturing camera 21 can supply images captured by the oblique camera 21a and the planar camera 21b to the display unit 32 of the centralized control device 6 to display them as real-time images.

The capturing camera 21 may be provided with a focus function and a zoom function in the oblique camera 21a and the planar camera 21b, or may not have these functions but has a focal length and a diaphragm for implementing a deep depth of field so as to perform capturing using a camera capable of pan-focus capturing and to display the image in an appropriate image size by processing at the side of the visual inspection computer 24 or the centralized control device 6.

The capturing camera 21 may include a plurality of oblique cameras 21a. For example, the capturing camera 21 may be provided with a pair of oblique cameras 21a comprising a high-magnification camera and a low-magnification camera at positions opposite to each other with respect to the rotation axis of the rotation mechanism and may use one of them in accordance with the size of the inspection portion. In the capturing camera 21, a plurality of oblique cameras 21a may be provided concentrically around the rotation axis of the rotation mechanism, and these plurality of oblique cameras 21a may be arranged at equal intervals or at unequal intervals.

When an inspection object is carried in, the capturing camera 21 refers to the defective portion data (XYO coordinate data) stored in the second database 5B as position data of the inspection-required portion and pre-captures the inspection-required portion at a predetermined angle and magnification. The captured image is stored in the first database 5A, read out in response to the operation of the inspector, and displayed on the display unit 32 of the centralized control device 6. In addition, at the time of additional capturing to be described later, the captured image is displayed as a real-time image. The inspector operating the centralized control device 6 performs the quality determination by viewing the pre-captured image and the real-time image displayed on the display unit 32.

In the pre-capturing, one or more images of the inspection-required portion may be captured. Further, in the pre-capturing, the inspection-required portion may be captured a plurality of times at different magnifications and angles. In the case where a plurality of images are pre-captured, they may be displayed in the display unit 32 of the centralized control device 6 at the same time, or they may be sequentially displayed in response to the operation of the inspector.

Further, in pre-capturing, an inspection-required portion may be captured as a moving image. In this pre-captured moving image, the magnification and angle of the inspection-required portion may be changed during the pre-capturing. In the case where the image is pre-captured as a moving image, reproduction speed adjustment, rewinding, and the like may be performed on the pre-captured moving image displayed on the display unit 32 of the centralized control device 6 in response to the operation by the inspector.

Further, in the pre-capturing, one or a plurality of still image capturing and moving image capturing may be used together. On the display unit 32 of the centralized control device 6, one or a plurality of pre-captured images (still image) and a pre-captured moving image may be displayed side by side or sequentially in response to the operation by the inspector.

The support unit 22 may have any structure as long as it is a mechanism for detachably fixing and supporting the inspection object. For example, the support unit 22 may have a pair of long side frames in which a support surface for supporting the lower surface of the outer edge of the printed circuit board 7 is protruded and formed to face each other, a pair of connecting bars for connecting both ends of the long side frames, and a fixing pin which slides along the longitudinal direction of the long side frames and fixes the printed circuit board 7.

Z-Axis Correction Value

In the visual appearance inspection device 3, the capturing camera 21 or the support unit 22 for supporting the inspection object may be provided with a moving mechanism in the vertical direction (Z-axis direction) and a correcting unit in the Z-axis direction, so that the relative distance between the capturing camera 21 and the inspection object in the Z-axis direction can be varied. Thus, even when warpage occurs in the plate-like inspection object such as the printed circuit board 7, the capturing position of the capturing camera 21 can be corrected in the Z-axis direction, so that the inspection-required portion can be surely captured.

Figure 7:
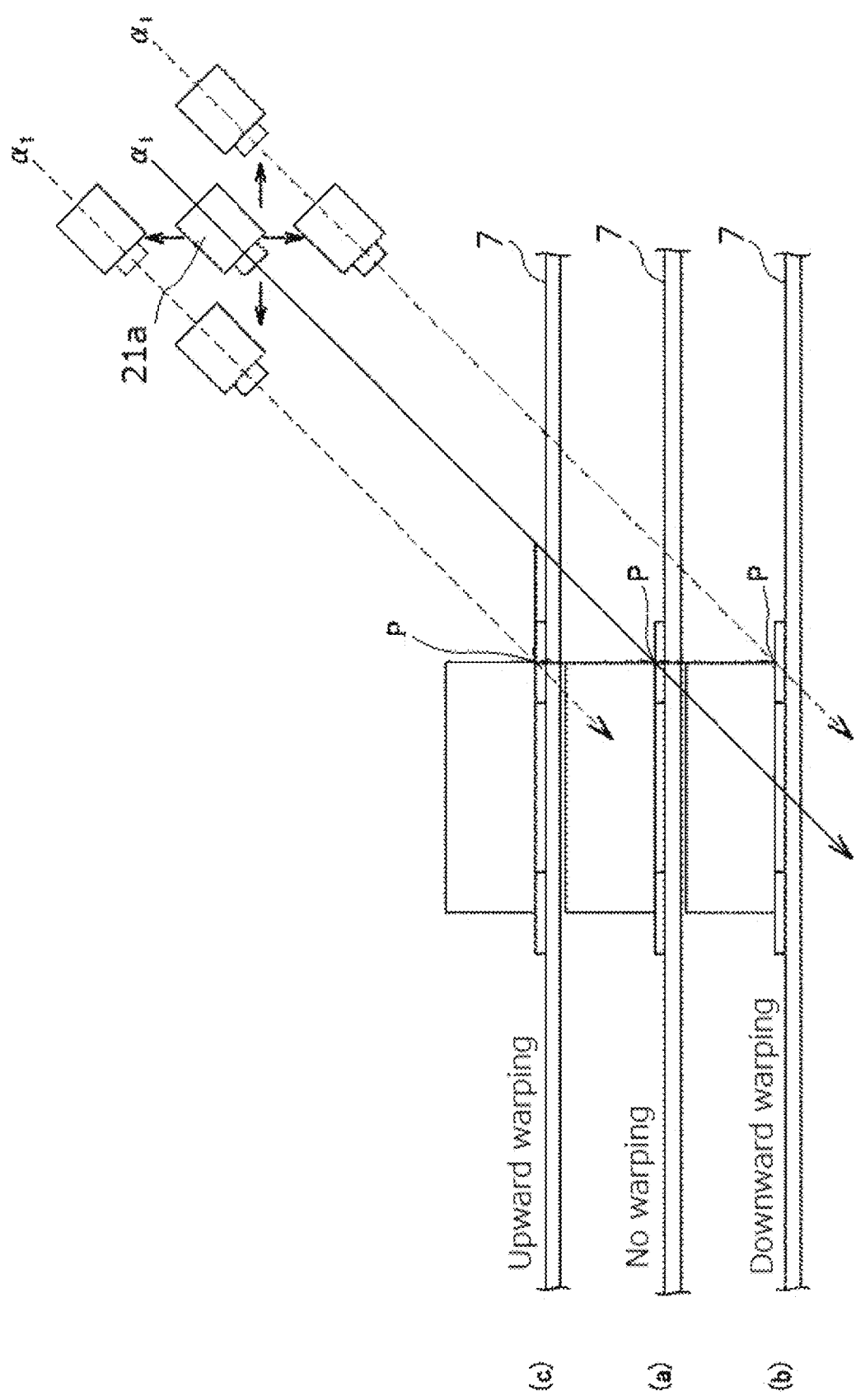
FIG. 7 is a view illustrating states of a non-warped, upward-warped, and downward-warped substrates.

That is, as shown in FIG. 7 (a), when the printed circuit board 7 is not warped, the inspection-required portion specified on the basis of the position data set by the automatic appearance inspection device 2 coincides with the portion displayed on the display unit 32 and to be actually inspected. Therefore, by setting the relative position between the printed circuit board 7 and the capturing camera 21 on the basis of the position data (XYO coordinates) of the inspection-required portion, the optical axis of the oblique camera 21a coincides with the inspection-required portion of the electronic component set on the printed circuit board 7, and the oblique camera 21a captures the portion to be inspected.

However, in the case that the printed circuit board 7 is warped downward as shown in FIG. 7 (b), or in the case that the printed circuit board 7 is warped upward as shown in FIG. 7 (c), when the relative position between the printed circuit board 7 and the oblique camera 21a of the capturing camera 21 is set in the visual appearance inspection device 3 on the basis of the position data of the inspection-required portion set on the printed circuit board 7 by the automatic appearance inspection device 2, a gap occurs between the inspection-required portion specified in the automatic appearance inspection device 2 and the image captured by the oblique camera 21a displayed on the display unit 32, so that the portion to be inspected by the oblique camera 21a cannot be captured or might be out of focus.

In FIG. 7 (c), since the printed circuit board 5 is upward-warped, the optical axis α1 of the oblique camera 21a is in front of the inspection-required portion, and in FIG. 7 (b), since the printed circuit board 5 is downward-warped, the optical axis α1 of the oblique camera 21a is behind the inspection-required portion. In these cases, if the relative positions of the printed circuit board 7 and the capturing camera 21 are set on the basis of the data of the inspection-required portion set by the automatic appearance inspection device 2, the portions that need to be inspected cannot be captured by visual inspection, and it is not clear for the inspector which positions of which surface-mounted components should be viewed. In particular, in recent years, as a surface-mounted component, a very small chip component such as a 0603 chip whose one side is less than 1 mm is used, and since these very small chips are mounted at a high density, it becomes difficult to confirm a portion to be inspected on the display unit 32.

Therefore, in the visual appearance inspection device 3, it is preferable to provide a moving mechanism in the vertical direction (Z-axis direction) and a correction unit in the Z-axis direction on the capturing camera 21 or on the support unit 22 for supporting the inspection object to change the relative distance between the capturing camera 21 and the inspection object in the Z-axis direction.

As the vertical movement mechanism for the capturing camera 21 or the support unit 22, a known movement mechanism can be employed.

The Z-axis direction correction unit can be, for example, a unit for measuring the amount of deflection of an inspection object (the printed circuit board 7) using a laser displacement meter or the like and correcting the relative distance (height direction: Z-axis direction) of the capturing camera 21 or the support unit 22 on the basis of the measured value. In order to grasp the deflection, the height of a reference point of the printed circuit board 7 is measured in advance. For example, the height of a position in the substrate circumference such as a position near the origin (X:Y=0:0) of the lower left portion, a position near the upper left portion, a position near the upper right portion, and a position near the lower right portion of the rectangular substrate or another position where the deflection amount can be assumed to be about zero may be measured. The measurement position may be one, but it is preferable to measure more than one positions. When the measurement position is only one, the height of the measurement point is set to be the reference value, and when there are multiple measurement points, the average height of the measurement points is set to be the reference value.

Then, the substrate height of the inspection-required portion of the inspection object (the printed circuit board 7) is measured using a laser displacement meter or the like, and a difference value from the reference value is calculated. This difference value is used as a correction amount in the Z-axis direction. The correction amount in the Z-axis direction is measured in advance of the inspection process and stored in the first database 5A in association with the substrate ID or the like. The correction in the Z-axis direction is not limited to the above-described method, and a known technology can be used.

When the capturing camera 21 of the visual appearance inspection device 3 pre-captures an inspection-required portion, the relative height between the capturing camera 21 and the support unit 22 is corrected by referring to the correction amount in the Z-axis direction of the inspection-required portion on the substrate. Thus, in the visual inspection process, the visual inspection image corrected in advance in the Z-axis direction is displayed so that any additional operation such as manually correcting the capturing camera 21 in the Z-axis direction is not required, thereby reducing the tact time of the inspection process.

The correction amount in the Z-axis direction is referred to at the time of additional capturing in addition to the pre-capturing. Further, the correction amount in the Z-axis direction may be measured in the first inspection of the inspection object (the printed circuit board 7) in the inspection process, stored in the first database 5A in association with the substrate type ID or the like, and referred to in the following pre-capturing or additional capturing of the inspection object of the same substrate type. Alternatively, the correction amount in the Z-axis direction may be measured every time the inspection object is carried into the visual appearance inspection device 3 and may be used for pre-capturing or additional capturing.

The device housing may be provided with illumination device (not shown) for illuminating the inside of the housing.

Main Visual Inspection Portion

In the inspection system 1, the visual appearance inspection device 3 may set main visual inspection portions that should be inspected mainly in a predetermined inspection object. For example, when a defect is likely to occur at a specific portion of the printed circuit board 7, the portion is registered in advance as a portion to be pre-captured by the capturing camera 21, and the visual inspection of the portion is always performed as the inspection-required portion regardless of the determination result of the automatic appearance inspection device 2. The position data (XYO coordinates) of the main visual inspection portion where the visual inspection should be always performed is stored in the first database 5A in advance in association with the substrate type ID or the like, and when the visual inspection is performed on the same substrate type or the like, the position data is referred to, and the capturing camera 21 pre-captures the position. Since all the pre-captured images are displayed on the display unit 32 and inspected by the inspector, the main visual inspection portion is also visually inspected.

Additional Capturing

In the visual appearance inspection device 3, when an additional capturing instruction is received from the centralized control device 6 during a visual inspection using the pre-captured image, the capturing camera 21 is driven in response to the operation of the centralized control device 6 to capture the inspection object. The additionally captured image is displayed as a real-time image on the display unit 32 of the centralized control device 6. Thus, the inspector operating the centralized control device 6 can view the inspection object at a desired angle, magnification, or the like, and can observe the inspection-required portion in more detail, for example, when it is difficult to make a determination at a predetermined angle or magnification by pre-capturing.

It should be noted that the image additionally captured by the visual appearance inspection device 3 is converted into data in response to the operation of the centralized control device 6 and is stored in the first database 5A as the visual inspection image used for the determination in association with the determination result and other information.

Further, the visual appearance inspection device 3 may capture one or a plurality of still images of the real-time images obtained by the additional capturing and store the additionally captured image data in the first database 5A in response to the operation of the centralized control device 6. Further, the visual appearance inspection device 3 may convert the real-time image obtained by the additional capturing into data and store the additional capturing moving image data in the first database 5A. Further, the additionally captured image data and the additionally captured moving image data may be appropriately displayed on the display unit 32 of the centralized control device 6 and may be stored in the first database 5A as the visual inspection image used for determination in association with the determination result and other information.

Further, the additional capturing condition data such as the angle and the magnification set by the inspector may be stored in the first database 5A as the visual inspection data in association with the substrate type ID or the like, and the subsequent pre-capturing for the same substrate type or the like may be performed on the basis of the additional capturing condition data, or the subsequent pre-capturing may be performed on the basis of the additional capturing condition data in addition to the predetermined pre-capturing conditions. As a result, an inspection object such as of the same substrate type can be captured under a desirable capturing conditions at the time of pre-capturing, and the visual inspection by the inspector can be efficiently performed.

Further, when the pre-captured image is displayed on the display unit 32 and visually inspected by the inspector, the visual appearance inspection device 3 may wait at the position where the capturing camera 21 which has performed the pre-capturing captured a first inspection portion on which the inspector performs a first visual inspection for the pre-captured image. When there are a plurality of inspection-required portions with respect to one inspection object, that is, when there are a plurality of captured images to be visually inspected, the captured images are displayed on the display unit 32 in a predetermined order and are used for the visual inspection by the inspector.

Here, the visual appearance inspection device 3 causes the capturing camera 21 to wait at the position where the first inspection portion is captured in preparation for the additional capturing instruction from the inspector. The first inspection portion refers to a portion of an inspection object under a visual inspection at which a pre-captured image is first displayed on the display unit 32. Thus, when the inspector instructs additional capturing, the capturing camera 21 can quickly perform additional capturing without moving the capturing camera 21, thereby reducing the tact time of the inspection process.

In addition, the visual appearance inspection device 3 may move the capturing camera 21 to positions corresponding to pre-captured images sequentially displayed on the display unit 32. By moving the capturing camera 21 to a position displayed on the display unit 32 in this manner, when the inspector instructs additional capturing, the capturing camera 21 can immediately perform the additional capturing without necessity of moving the capturing camera 21, thereby reducing the tact time of the inspection process.

The inspector uses the visual appearance inspection device 3 of the inspection system 1 to determine the quality of the soldering of electronic components mounted on the printed circuit board 7, for example, and inputs a visual determination result. The input visual determination result is sent via the communication module 23 and stored in the first database 5A.

Further, from the visual appearance inspection device 3, various data such as "visual inspection image", "additional capturing condition data", "required inspection time", and "defect content" are associated with each other and with the visual determination result and stored in the first database 5A through the communication module 23. The term "visual inspection image" refers to a pre-captured image or an additionally captured image used for visual determination. The "additional capturing condition data" refers to capturing conditions such as the angle and magnification for additional capturing specified by the inspector. The "required inspection time" refers to the time taken from the display of the visual inspection image to the input of the visual determination result. The "defect content" is the same as the "defect content" in the automatic inspection data described above, but is appropriately modified according to the result of the visual inspection. In the first database 5A, data such as the visual determination result, the visual inspection image, additional capturing condition data, the required inspection time, and the defect content are maintained as the visual inspection data.

Operational Flow

Figure 8:
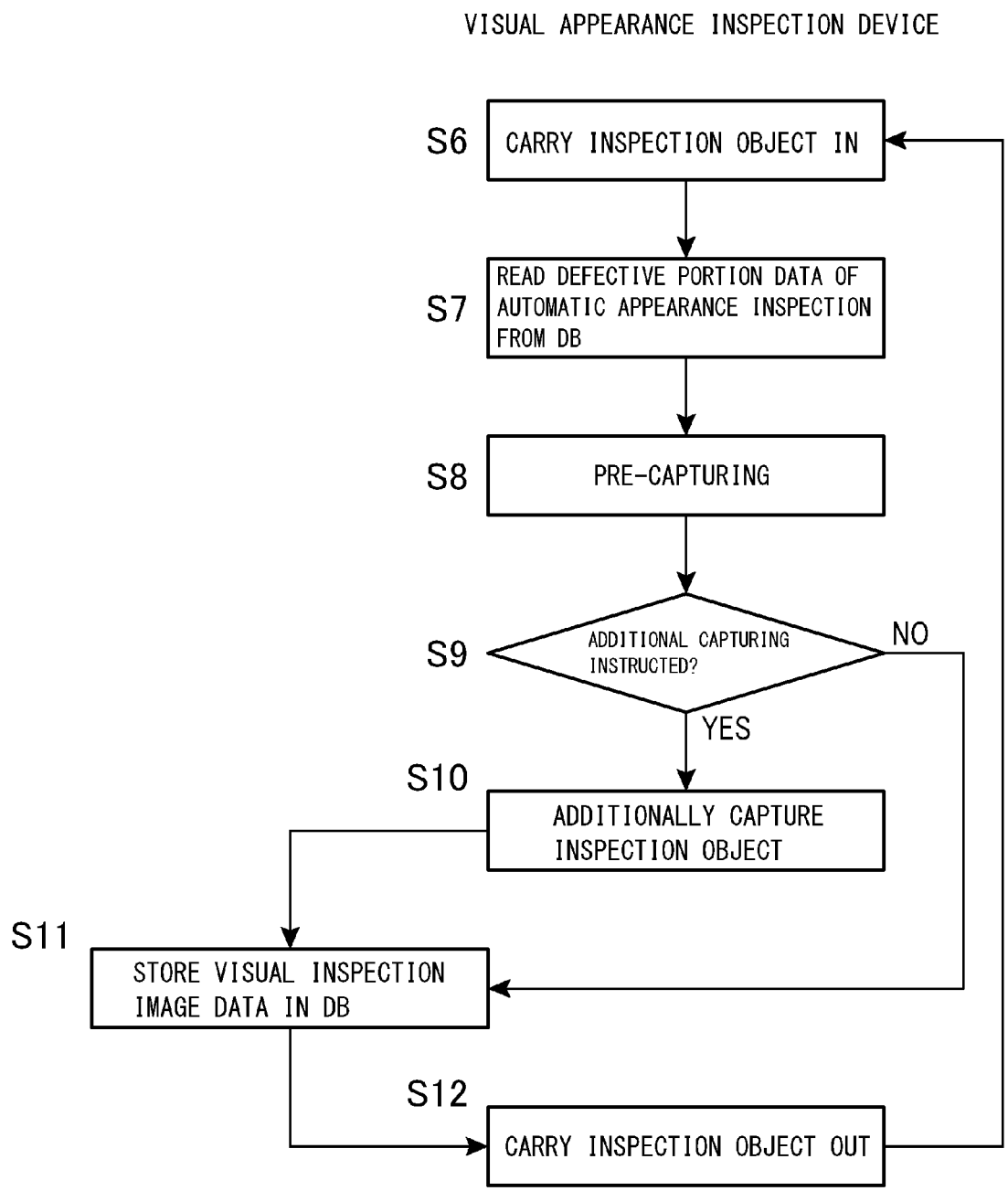
FIG. 8 is a flowchart illustrating an operational flow of a visual appearance inspection device.

Next, the operation of the visual appearance inspection device 3 will be described. As shown in FIG. 8, first, in step S6, an inspection object such as a printed circuit board is carried into the visual appearance inspection device 3. Next, in step S7, the defective portion data specified by the automatic appearance inspection device 2 and stored in the second database 5B, in other words, the XYO coordinate data of the inspection-required portion where a defect of the inspection object is found and a visual inspection is required is referred to. The visual appearance inspection device 3 receives automatic inspection data such as a substrate ID, a component ID, and a defect content from the second database 5B. In step S8, the capturing camera 21 is moved to a position for capturing the inspection-required portion, and an image is captured at a predetermined angle and magnification. Step S8 is performed in advance while the inspector using the centralized control device 6 inspects the visual inspection image of the other inspection line 4. When there are a plurality of inspection-required portions, the capturing camera 21 sequentially pre-captures them. The pre-captured image captured by the capturing camera 21 is stored in the first database 5A via the bus 8. When the pre-capturing is finished, the capturing camera 21 moves to a position where the first inspection portion is captured and waits for an additional capturing instruction. The pre-captured image stored in the first database 5A is displayed on the display unit 32 in response to the display switching operation on the centralized control device 6 and used for visual inspection.

In step S9, it is determined whether or not an operation signal instructing additional capturing is input from the centralized control device 6, and if there is an input, in step S10, the capturing camera 21 is driven in response to the operation on the centralized control device 6 to capture the inspection object at an angle and magnification in accordance with the operation. The captured image is displayed as a real-time image on the display unit 32 of the centralized control device 6 and is used for visual inspection.

After the completion of the additional capturing, in step S11, in response to the operation on the centralized control device 6, the image used for the determination is converted into data and stored in the first database 5A as a visual inspection image used for the determination in association with the determination result and other information. When there is no additional capturing instruction, the pre-captured image used for the determination is stored in the first database 5A as the visual inspection image used for the determination in association with the visual determination result and other visual inspection data. When there is no correction in the "defect content" of the automatic inspection data, it is left as it is, and when there is a correction, it is appropriately corrected and stored in the first database 5A as visual inspection data.

Thereafter, in step S12, the inspection object is carried out and the next inspection object is carried in. Thus, the visual appearance inspection device 3 can enable continuous inspection while carrying into and out of the inspection objects conveyed on the inspection line 4 one after another.

Centralized Control Device

The centralized control device 6 is a device for sequentially displaying visual inspection images captured by the visual appearance inspection devices 3 of the plurality of inspection lines 4 and enabling visual inspection of respective inspection objects which are conveyed through the plurality of inspection lines 4 in a concentrated manner at one place, and is connected to the automatic appearance inspection device 2, the visual appearance inspection device 3, and the first and second databases 5A, 5B via the bus 8.

Figure 9:
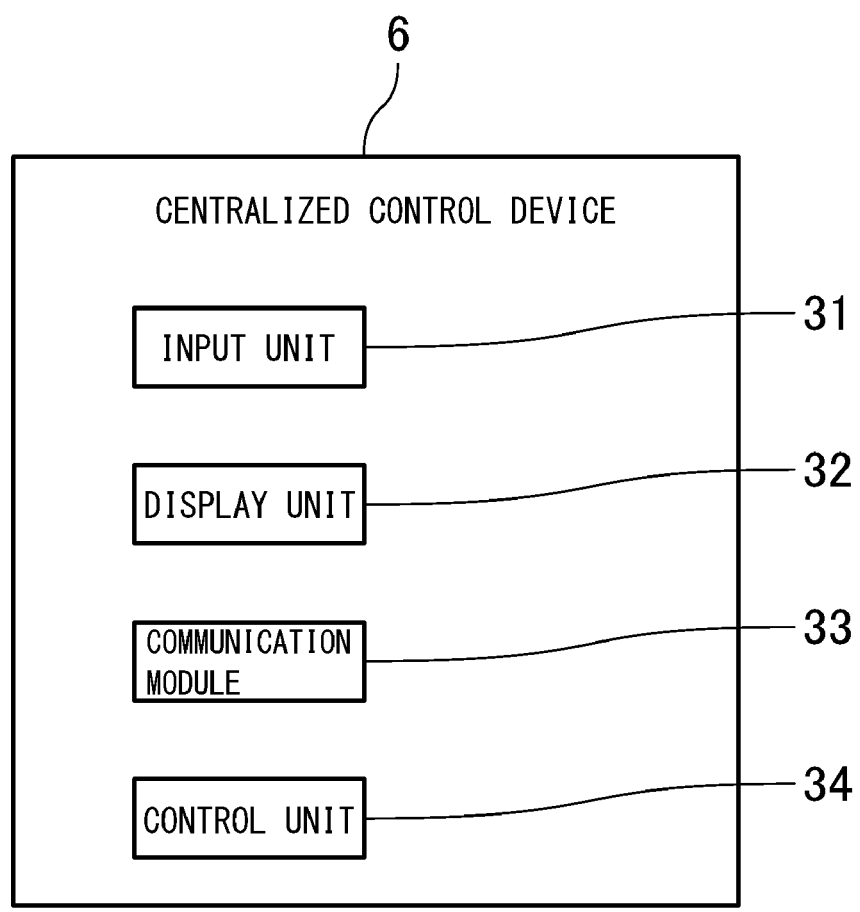
FIG. 9 is a view illustrating a main configuration of a centralized control device.

As shown in FIG. 9, the centralized control device 6 is provided with: an input unit 31 for inputting a visual determination result and an additional capturing instruction of a visual inspection image by an inspector; the display unit 32 on which the visual inspection image (pre-captured image and additionally captured image) captured by the visual appearance inspection device 3 and related information of the visual inspection image are displayed; a communication module 33 for communicating with the first database 5A and the visual appearance inspection device 3; and a control unit 34 for controlling the operation of the entire inspection system 1 such as image switching of the display unit 32 and communication with the visual appearance inspection device 3.

In the input unit 31, the inspector inputs instructions for executing the inspection process of the inspection system 1, such as visual determination results, a capturing instruction for capturing a visual inspection image, and a switching instruction to switch the inspection line 4 displayed on the display unit 32. As the input means, a known input means such as an operation panel provided with input buttons, levers, or the like, a mouse, a keyboard or the like for inputting instructions on an operation display screened on the display unit 32 can be used.

The inspector operating the centralized control device 6 can perform all operations on the visual appearance inspection device 3 and the first database 5A through the input unit 31, such as inputting a visual determination result, a display screen switching instruction for switching a screen of a visual inspection image to be visually inspected, an additional capturing instruction, a camera movement instruction, a storage instruction for converting the visual determination image into a data and storing the converted data in the first database 5A, among other operations.

The visual determination result input through the input unit 31 includes a quality determination result and defect contents. Defect contents categorized in advance may be displayed on the display unit 32, and either one or a plurality of defect contents may be selected, or a free entry field may be provided to enable the inspector to enter the defect contents.

In response to the display screen switching instruction, the waiting visual appearance inspection devices 3 on the inspection lines having completed the pre-capturing are displayed as a list on the display unit 32, and the visual inspection images are switched in the display order according to the switching instruction. Alternatively, the inspector may select any one of the visual appearance inspection devices 3 displayed in the list to switch the visual inspection image displayed on the display unit 32.

The additional capturing instruction and the camera movement instruction specify the position, angle, and magnification, among others, of the capturing camera 21 in order to acquire a desired additional captured image.

The storage instruction to convert the visual determination image into data and store it in the first database 5A is an operation to store the visual inspection image used as the basis of the determination in the first database 5A as image data. The image additionally captured by the visual appearance inspection device 3 is a real-time image and is not a recorded and reproduced image. Therefore, a visual inspection image used as the basis of the quality determination is stored as image data in the first database 5A in association with data such as a quality determination result, a defect content, and a substrate ID. When the additional capturing is not performed, the data of the pre-captured image which is the basis of the determination is stored in the first database 5A in association with the data such as a quality determination result, a defect content, and a substrate ID.

The display unit 32 has one or a plurality of monitors to display a visual inspection image (pre-captured image and additionally captured image) captured by the visual appearance inspection device 3, a list of the visual appearance inspection devices 3 on the inspection lines 4 being visually inspected or waiting for the visual inspection, and an operation screen, among others.

The control unit 34 controls each unit of the centralized control device 6 in response to the operation of the inspector, thereby enabling centralized inspection on the plurality of inspection lines 4, and is constituted by, for example, a computer. The control unit 34 can remotely operate the visual appearance inspection device 3 and the first database 5A via the bus 8 to perform necessary processing.

Operational Flow

Figure 10:
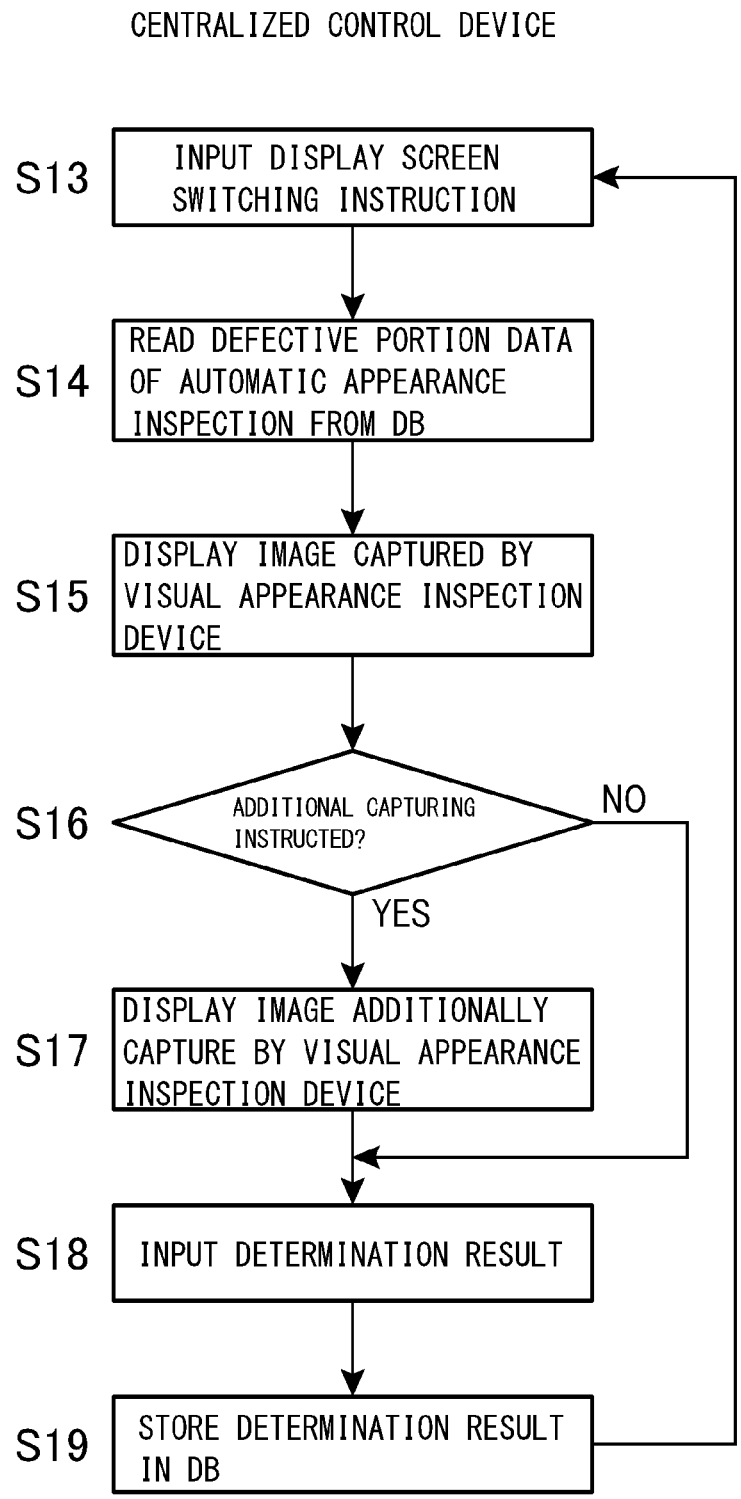
FIG. 10 is a flowchart showing an operational flow of a centralized control device.

The operation of the centralized control device 6 will be described. As shown in FIG. 10, in step S13, the inspector inputs a display screen switching instruction by operating the input unit 31 of the centralized control device 6. Next, in step S14, the centralized control device 6 retrieves the inspection object data such as the substrate ID and the substrate type ID of the inspection object (the printed circuit board 7) to be displayed on the display unit 32, the automatic inspection data such as the automatic determination result of the automatic appearance inspection device 2, the defective portion data, and the defect content, and the pre-captured image data captured by the visual appearance inspection device 3 from the first database 5A and the visual appearance inspection device 3. Then, in step S15, the centralized control device 6 displays the visual inspection image (pre-captured image) captured by the visual appearance inspection device 3 specified by the switching instruction on the display unit 32, and the visual inspection is performed by the inspector.

When it is not possible to perform the quality determination on the basis of the predetermined visual inspection image, the inspector performs an operation for additional capturing of a desired position at a desired angle and magnification. In step S16, the centralized control device 6 determines whether an operation signal instructing additional capturing is input from the input unit 31, and if there is an input, in step S17, the capturing camera 21 of the visual appearance inspection device 3 is driven in accordance with the operation signal from the input unit 31 to capture the inspection object at an angle and magnification specified by the operation. The captured image is displayed on the display unit 32 as a real-time image, and a visual inspection is performed by the inspector.

After the visual inspection, the determination result is input by the inspector in step S18. At this time, when it is determined that the inspection object data such as the defect content should be corrected, the correction content is also input. Next, in step S19, the centralized control device 6 stores the determination result in the first database 5A in association with the inspection data such as the substrate ID by the control unit 34. Further, the centralized control device 6 converts the visual inspection image (pre-captured image and additionally captured image) used for the determination into data and stores the data in the first database 5A in association with the determination result or the like. In addition, the centralized control device 6 stores the visual inspection data such as the required inspection time taken from the display screen switching instruction to the input of the determination result, the additional capturing condition data (position, angle, and magnification, among others), and the substrate type in association with the determination result or the like in the first database 5A. The additional capturing condition data is fed back to the pre-capturing condition of the same substrate type, so that the subsequent pre-capturing can be performed on the basis of the additional capturing condition data in addition to or instead of the predetermined pre-capturing condition.

When a display screen switching instruction for switching to the visual inspection image of another inspection line 4 is input, the centralized control device 6 reads the visual inspection image of the instructed inspection line 4 (pre-captured image) from the first database 5A and displays it on the display unit 32. Thus, the centralized control device 6 can display the visual inspection images captured by the visual appearance inspection devices 3 of the plurality of inspection lines 4 so that one inspector can perform the visual inspection of the plurality of inspection lines 4.

At this time, in the inspection system 1 according to the present technology, while a visual inspection image captured by a visual appearance inspection device 3 of one inspection line 4 is being inspected, the visual appearance inspection devices 3 of the other inspection lines 4 complete the pre-capturing of the predetermined inspection-required portion and wait in waiting state. Therefore, when the inspector inputs the display screen switching instruction, the visual inspection image (pre-captured image) of the inspection object of the other inspection line 4 is promptly displayed, and the visual inspection can be immediately performed.

Thus, in a system in which an image captured by the visual appearance inspection device 3 provided in each inspection line 4 is displayed on the centralized control device 6 for visual inspection, the inspection system 1 can reduce the tact time of the inspection process.

Database

Figure 11:
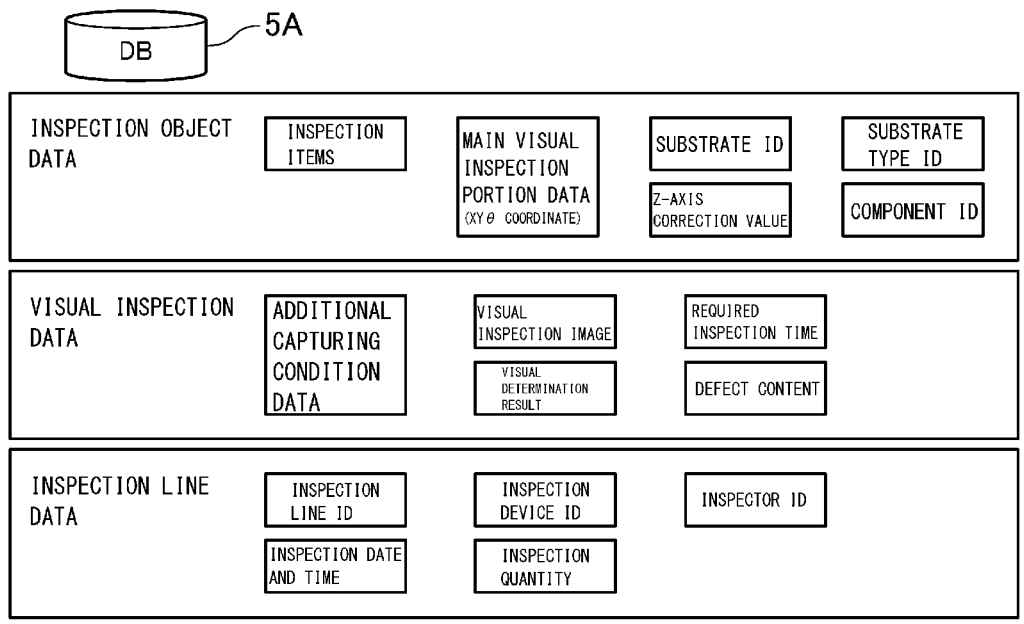
FIG. 11 is a diagram illustrating data stored in a database for a visual appearance inspection device.
Figure 12:
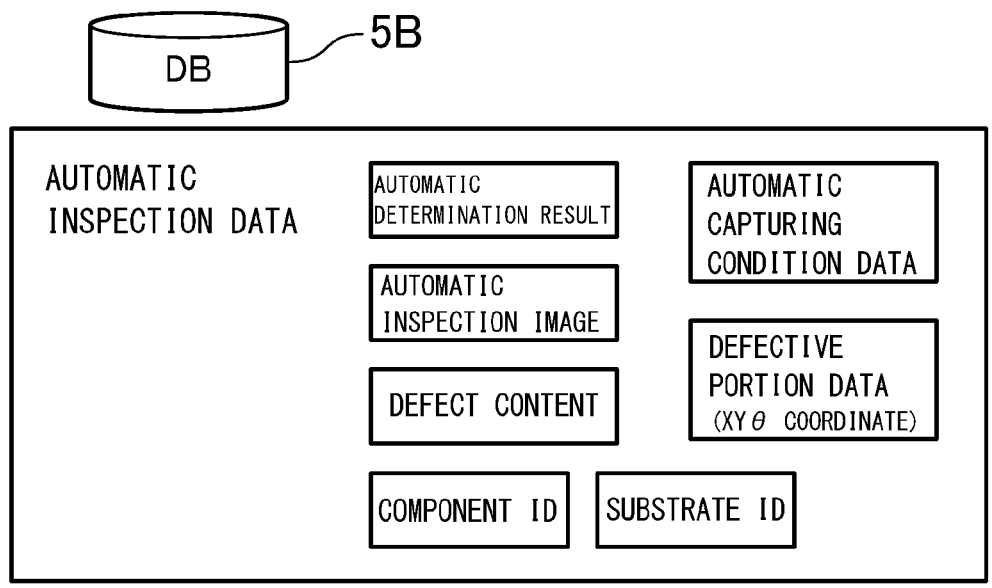
FIG. 12 is a view illustrating data stored in a database for an automatic appearance inspection device.

The database 5 includes the first database 5A connected to the visual appearance inspection device 3 and storing various data acquired by the visual appearance inspection device 3, and the second database 5B connected to the automatic appearance inspection device 2 and storing various data acquired by the automatic appearance inspection device 2. As shown in FIG. 11, the first database 5A stores inspection object data related to an inspection object (the printed circuit board 7), visual inspection data transmitted from the visual appearance inspection device 3, and inspection line data such as an identification (ID) of the inspection line and an identification (ID) of the inspector operating the centralized control device 6. As shown in FIG. 12, the second database 5B stores various kinds of automatic inspection data transmitted from the automatic appearance inspection device 2.

As the automatic inspection data, for example, data such as automatic determination results, automatic inspection images, automatic capturing condition data (angle, magnification, or the like), and defective portion data (XYO coordinates) are maintained. As the inspection object data, for example, data such as inspection items, main visual inspection portion data, substrate IDs, substrate type IDs, component IDs, and Z-axis correction values are maintained. As the visual inspection data, for example, data such as visual inspection results, visual inspection images used for visual inspections, additional capturing condition data (position, angle, and magnification, among others), required inspection times, and defect contents based on visual inspections are maintained. As the inspection line data, data such as inspection line IDs associated with each of the inspection lines, automatic appearance inspection device IDs associated with each of the automatic appearance inspection devices, visual appearance inspection device IDs associated with each of the visual appearance inspection devices, inspector IDs associated with each of inspectors, inspection date and times, and inspection quantities are maintained. The data maintained in the first and second databases 5A and 5B are not limited to the data described above.

Each data is maintained in association with each other and is referred to each other in response to the operation of the centralized control device 6. Further, each data is maintained in association with each other and is utilized for verification of determination accuracy, improvement of automatic determination accuracy, inspection support for inspectors, and evaluation and improvement of inspection ability of inspectors, among other purposes.

It should be noted that the first database 5A may be integrated with the centralized control device 6 or may be configured as a server connected by a network connection to the second database 5B, the automatic appearance inspection device 2, the visual appearance inspection device 3, and the centralized control device 6 via the bus 8.

The inspection system 1 described above is provided with two databases, the first database 5A for the visual appearance inspection device 3 and the second database 5B for the automatic appearance inspection device 2, but the database may be constituted by one database 5 connected to the automatic appearance inspection device 2, the visual appearance inspection device 3, and the centralized control device 6 via the bus 8.

Inspection Flow

Figure 13:
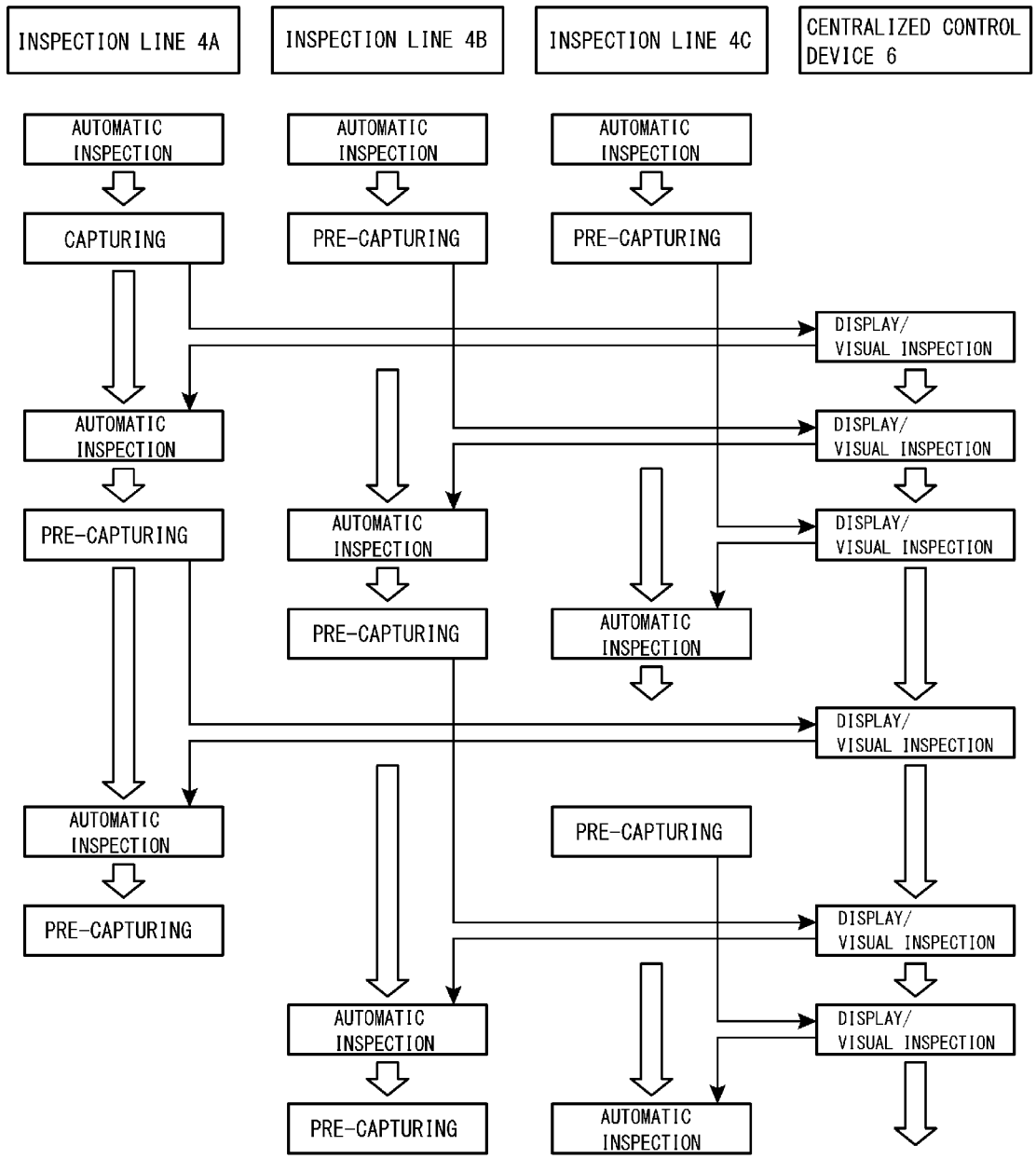
FIG. 13 is a flow chart illustrating an operational flow of an inspection system.

Next, the inspection process of the entire inspection system 1 will be described with reference to FIG. 13. In the following description, three inspection lines 4A, 4B, and 4C are provided as inspection lines, and visual inspections for these three inspection lines are performed by using one centralized control device 6; however, the present technology is not limited thereto.

In each of the inspection lines 4A, 4B, and 4C, the automatic inspection by the automatic appearance inspection device 2 is followed by the pre-capturing by the visual appearance inspection device 3, and the pre-captured image is stored in the first database 5A. The centralized control device 6 sequentially displays the pre-captured images read from the first database 5A, and the visual inspection is performed by the inspector.

When starting from the inspection in the inspection line 4A, in the centralized control device 6, when the capturing of the inspection line 4A by the visual appearance inspection device 3 is completed, the pre-captured image is displayed on the display unit 32 as a visual inspection image. After additional capturing, if any, is performed, a visual determination result is input. The control unit 34 stores visual inspection data such as the visual determination result in the first database 5A.

During this, also in the inspection lines 4B and 4C, after the automatic inspection, the visual appearance inspection device 3 performs the pre-capturing, stores the pre-captured image in the first database 5A, and waits at a state in which the capturing camera 21 captured the inspection-required portion. The control unit 34 of the centralized control device 6 detects that the visual appearance inspection device 3 of each inspection line 4 has completed the pre-capturing and is in a waiting state. When the inspector enters the visual determination result on the inspection line 4A and inputs the display screen switching instruction, the control unit 34 retrieves the pre-captured image of the inspection line (assumed herein as the inspection line 4B), which is pre-captured by the visual appearance inspection device 3 and which can be visually inspected, from the first database 5A and displays the pre-captured image on the display unit 32 in the order in which the pre-capturing is completed, and the visual inspection is performed.

During this, in the inspection line 4A, the visual appearance inspection device 3 performs the pre-capturing following the automatic inspection, stores the pre-captured image in the first database 5A, and waits in a state in which the inspection-required portion is captured by the capturing camera 21. As described above, during the inspection of one inspection line 4 by the centralized control device 6, the inspection system 1 pre-captures the inspection object conveyed on the other the inspection line 4 by the visual appearance inspection device 3 of the other inspection line 4 under the predetermined capturing conditions. When the inspection of the one inspection line 4 is completed, the inspector switches the display of the display unit 32 of the centralized control device 6 to the image of the other inspection line 4. At this time, since the capturing camera of the visual appearance inspection device 3 of the other inspection line 4 has pre-captured an image of the inspection-required portion at a predetermined angle and a predetermined depth of focus in advance, the inspector can promptly perform the visual inspection of the inspection object of the other inspection line 4 only by reading out the pre-captured image.

Thus, in a system in which an image captured by the visual appearance inspection device 3 provided in each inspection line 4 is displayed on the centralized control device 6 for visual inspection, the inspection system 1 can reduce the tact time of the inspection process.

It should be noted that, in each inspection line 4, the visual inspection is not always performed following the automatic inspection. For example, in the case where the automatic appearance inspection device 2 clearly determines that the object is OK, or in the case where the defect is so clear that the visual inspection is not necessary (NG: No Good), the automatic determination result may be stored in the second database 5B and excluded from the visual inspection to be performed by using the visual appearance inspection device 3. Therefore, the waiting order (display order) of the visual inspection may be irregular. Of course, in the case of a complete inspection, the waiting order (display order) of the visual inspection may be regular.

In addition, the visual inspection images displayed on the centralized control device 6 may be inspected in the order of display of the inspection line 4 in which the pre-capturing has been completed, or the visual inspection images of the inspection line 4 designated by the inspector may be inspected. Thus, for example, it is possible to designate an inspection line in which defects occur frequently and the number of inspection processes is insufficient, and to preferentially inspect the line.

The functions of each component of the inspection system 1 according to the present technology can be shared among a plurality of devices via a network and be jointly processed as cloud computing. For example, the first and second databases 5A and 5B can be implemented by a server storage or the like. Alternatively, one or a plurality of databases of the first and second databases 5A and 5B, for example, databases for the respective automatic appearance inspection devices may be implemented by external storage connected through a network.

Further, a computer program that implements each function of the inspection system 1 according to the present technology may be produced and installed in a personal computer or the like. A computer-readable recording medium storing such a computer program can also be provided. The recording medium is, for example, a magnetic disk, an optical disk, a magneto-optical disk, a flash memory, or the like. The computer program can also be distributed via a network, for example, without using such a recording medium.

DESCRIPTION OF REFERENCE CHARACTERS 1 inspection system, 2 automatic appearance inspection device, 3 visual appearance inspection device, 4 inspection line, 5A first database, 5B second database, 6 centralized control device, 7 printed circuit board, 8 bus, 11 capturing camera, 12 inspection computer, 13 communication module, 21 capturing camera, 21a oblique camera, 21b planar camera, 31 input unit, 32 display unit, 33 communication module, 34 control section

What is claimed is:
1. An inspection system, comprising:
a plurality of inspection lines each having a visual appearance inspection device and an automatic appearance inspection device that automatically inspects inspection objects prior to an inspection of the visual appearance inspection device;
a first database for storing a captured image captured by each of the visual appearance inspection devices;
a second database for storing automatic inspection data including a determination result of the automatic inspection performed by the automatic appearance inspection device and defective portion data; and
a centralized control device connected to each of the visual appearance inspection devices, the first database, and the second database, having a communication unit for communicating with the visual appearance inspection device and the first and second databases, a display unit that displays an inspection image of an inspection object, and a control unit that controls operations of the visual appearance inspection device and the first and second databases, and enabling visual inspection of the inspection object conveyed on each of the inspection lines in a centralized manner,
wherein, in the centralized control device, while one of the inspection lines is inspected, the visual appearance inspection device of an other of the inspection lines refers to the defective portion data to pre-capture the inspection object conveyed on the inspection line under predetermined capturing conditions and stores the pre-captured image in the first database, and displays the pre-captured image read from the first database on the display unit in the visual inspection.

2. The inspection system according to claim 1, wherein the pre-captured image is a still image and/or a moving image.

3. The inspection system according to claim 1, wherein, in response to an operation by an inspector of the centralized control device, the pre-captured image captured by each of the visual appearance inspection devices displayed on the display unit is switched.

4. The inspection system according to claim 1,
wherein a correction value in a Z-axis direction of the inspection object is acquired in advance,
wherein the correction value is stored in the first database, and
wherein, in the pre-capturing, a correction in the Z-axis direction of the inspection object is performed with reference to the correction value.

5. The inspection system according to claim 1,
wherein main visual inspection portions for the visual appearance inspection device is set in advance and position data of the main visual inspection portions are stored in the first database, and
wherein, in the pre-capturing, the main visual inspection portions are captured with reference to the position data of the main visual inspection portions.

6. The inspection system according to claim 1,
wherein, when an inspector instructs the visual appearance inspection device to perform additional capturing in the visual inspection, the visual appearance inspection device performs additional capturing in accordance with the instruction from the inspector, and
wherein a real-time image captured by the additional capturing is displayed on the display unit.

7. The inspection system according to claim 6, wherein condition data of the additional capturing are stored in the first database, and the visual appearance inspection device performs subsequent pre-capturing on a basis of the condition data of the additional capturing instead of or in addition to the predetermined pre-capturing conditions.

8. The inspection system according to claim 6,
wherein, when performing a visual inspection by an inspector, the visual appearance inspection device waits at a position where a capturing camera which has performed the pre-capturing captured a first inspection portion on which the inspector performs a first visual inspection for the pre-captured image.

9. The inspection system according to claim 6,
wherein, when performing a visual inspection by an inspector, the visual appearance inspection device moves a capturing camera which has performed the pre-capturing to a portion corresponding to a portion of the pre-captured image displayed on the display unit.

10. The inspection system according to claim 1, wherein the first database and the second database are integrated in one database.

11. The inspection system according to claim 1, wherein the automatic appearance inspection device and the visual appearance inspection device are each provided with capturing means for capturing images of inspection objects.

12. An inspection method, comprising:
preparing a plurality of inspection lines each having a visual appearance inspection device and an automatic appearance inspection device that automatically inspects inspection objects prior to an inspection of the visual appearance inspection device;
preparing a first database for storing a captured image captured by each of the visual appearance inspection devices;
preparing a second database for storing automatic inspection data including a determination result of the automatic inspection performed by the automatic appearance inspection device and defective portion data; and
preparing a centralized control device connected to each of the visual appearance inspection devices, the first database, and the second database, having a communication unit for communicating with the visual appearance inspection device and the first and second databases, a display unit that displays an inspection image of an inspection object, and a control unit that controls operations of the visual appearance inspection device and the first and second databases, and enabling visual inspection of the inspection object conveyed on each of the inspection lines in a centralized manner,
wherein, in the centralized control device, while one of the inspection lines is inspected, the visual appearance inspection device of an other of the inspection lines refers to the defective portion data to pre-capture the inspection object conveyed on the inspection line under predetermined capturing conditions and stores the pre-captured image in the first database, and displays the pre-captured image read from the first database on the display unit in the visual inspection.

* * * * *